US008822025B2

(12) United States Patent
Decker et al.

(10) Patent No.: US 8,822,025 B2
(45) Date of Patent: Sep. 2, 2014

(54) COATING SYSTEM EXHIBITING COOL DARK COLOR

(75) Inventors: Eldon L. Decker, Gibsonia, PA (US); Robert E. Jennings, Ellwood City, PA (US); Calum H. Munro, Wexford, PA (US); Noel R. Vanier, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 627 days.

(21) Appl. No.: 12/023,423

(22) Filed: Jan. 31, 2008

(65) Prior Publication Data

US 2008/0187708 A1 Aug. 7, 2008

Related U.S. Application Data

(60) Provisional application No. 60/899,608, filed on Feb. 5, 2007.

(51) Int. Cl.
*C09D 5/00* (2006.01)

(52) U.S. Cl.
USPC ........................................................ 428/323

(58) Field of Classification Search
CPC ......... C09D 5/00; C09D 5/004; C09D 7/1266
USPC ........................................................ 428/323
See application file for complete search history.

(56) References Cited

U.S. PATENT DOCUMENTS

| | | | |
|---|---|---|---|
| 2,294,875 A | 9/1942 | Hexter et al. | |
| 4,311,623 A | 1/1982 | Supcoe | |
| 4,546,045 A | 10/1985 | Elias | 428/424.6 |
| 4,656,226 A * | 4/1987 | Hutchins et al. | 525/93 |
| 5,319,001 A | 6/1994 | Morgan et al. | |
| 5,506,045 A | 4/1996 | Grochal | |
| 5,519,085 A | 5/1996 | Ma et al. | |
| 5,540,998 A | 7/1996 | Yamada et al. | |
| 5,749,959 A | 5/1998 | Supcoe | |
| 5,939,182 A | 8/1999 | Huang et al. | |
| 5,962,143 A | 10/1999 | Krauthauser et al. | 428/425.1 |
| 6,017,981 A | 1/2000 | Hugo | |
| 6,194,484 B1 | 2/2001 | Hugo | |
| 6,294,014 B1 | 9/2001 | Woodworth et al. | |
| 6,296,899 B1 | 10/2001 | Iizuka | |
| 6,306,209 B1 | 10/2001 | Woodworth et al. | |
| 6,336,966 B1 | 1/2002 | Coca et al. | |
| 6,365,666 B1 | 4/2002 | McCollum et al. | 524/548 |
| 6,366,397 B1 | 4/2002 | Genjima et al. | 359/359 |
| 6,376,597 B1 | 4/2002 | Coca et al. | |
| 6,399,228 B1 | 6/2002 | Simpson | |
| 6,441,066 B1 | 8/2002 | Woodworth et al. | |
| 6,462,125 B1 | 10/2002 | White et al. | |
| 6,521,038 B2 | 2/2003 | Yanagimoto et al. | |
| 6,590,049 B1 | 7/2003 | O'Dwyer et al. | |
| 6,623,556 B2 | 9/2003 | Zama | |
| 6,642,301 B2 | 11/2003 | White et al. | |
| 6,784,231 B2 | 8/2004 | Shimada et al. | |
| 6,875,800 B2 | 4/2005 | Vanier et al. | 523/210 |
| 7,137,713 B2 | 11/2006 | Harasawa et al. | |
| 7,157,112 B2 | 1/2007 | Haines | |
| 7,211,324 B2 | 5/2007 | Kamimori | |
| 7,338,704 B2 | 3/2008 | Decker et al. | |
| 2001/0044489 A1 | 11/2001 | Hugo | |
| 2002/0188051 A1 | 12/2002 | Hugo | |
| 2003/0030041 A1 * | 2/2003 | Genjima et al. | 252/587 |
| 2003/0110982 A1 | 6/2003 | Shimada et al. | |
| 2004/0018360 A1 | 1/2004 | Hugo | 428/411.1 |
| 2004/0068046 A1 | 4/2004 | Hugo | |
| 2004/0142205 A1 | 7/2004 | Chen et al. | |
| 2004/0191540 A1 | 9/2004 | Jakobi et al. | 428/457 |
| 2004/0250731 A1 | 12/2004 | Nagano et al. | |
| 2005/0014863 A1 * | 1/2005 | Babler | 523/160 |
| 2005/0129871 A1 | 6/2005 | Ruther et al. | |
| 2005/0129964 A1 | 6/2005 | Hugo | |
| 2005/0170171 A1 | 8/2005 | Vanier | |
| 2005/0214483 A1 | 9/2005 | Fujieda et al. | |
| 2005/0215685 A1 | 9/2005 | Haines | |
| 2005/0287348 A1 | 12/2005 | Faler et al. | 428/315.5 |
| 2006/0229407 A1 | 10/2006 | Vogel et al. | |
| 2006/0251895 A1 | 11/2006 | Lambert et al. | 428/384 |
| 2007/0087199 A1 | 4/2007 | Yoshimura et al. | |
| 2008/0102270 A1 | 5/2008 | Shiao et al. | |

FOREIGN PATENT DOCUMENTS

| | | |
|---|---|---|
| DE | 40 35 062 A1 | 5/1992 |
| DE | 4419748 C2 | 5/1999 |
| DE | 10248234 B3 | 2/2004 |
| EP | 0218436 | 4/1987 |
| EP | 0361327 A1 | 4/1990 |

(Continued)

OTHER PUBLICATIONS

Spinelli, Harry J., Group transfer polymerization and its use in water based pigment dispersants and emulsion stabilizers, Progress in Organic Coatings 27, (1966), 255-260, Elsevier Science S.A.

Wake, L.V., The effect of pigments in formulating solar reflecting and infrared emitting coatings for military applications, (1990), 78-80, Horizons.

Military Specification, MIL-C-46127A(MR), (Apr. 26, 1977), Coating, Gray, Undercoat (Solar Heat Reflecting), 1-16.

Military Specification, MIL-E-46136(MR), (Sep. 7, 1971), Enamel, Semi-Gloss, Alkyd, Solar Heat Reflecting, Olive Drab, 1-28.

Military Specification, MIL-E-46117(MR), (Dec. 29, 1967), Enamel, Alkyd, Lustreless, Solar Heat Reflecting, Olive Drab, 1-15.

Military Specification, MIL-E-46117A(MR), (Oct. 6, 1970), Enamel, Alkyd, Lustreless, Solar Heat Reflecting, Olive Drab, 1-25.

(Continued)

*Primary Examiner* — Elizabeth A Robinson
(74) *Attorney, Agent, or Firm* — William E. Kuss

(57) ABSTRACT

A layered coating composition for use in producing a cool dark coating composition. The coating system includes an IR reflecting layer, having IR-reflective pigments in a resinous binder. A radiation absorbing layer is coated onto the IR reflecting layer. The radiation absorbing layer includes nano-sized pigments dispersed in a resinous binder.

13 Claims, 1 Drawing Sheet

(56) References Cited

FOREIGN PATENT DOCUMENTS

| EP | 0246342 B1 | 7/1991 |
|---|---|---|
| EP | 0965392 | 12/1999 |
| EP | 1817383 B1 | 2/2009 |
| FR | 2538756 | 7/1984 |
| GB | 2420995 A | 6/2006 |
| JP | 55-74862 | 6/1980 |
| JP | 4-246478 | 9/1992 |
| JP | 05-293434 | 11/1993 |
| JP | 2000-279881 | 10/2000 |
| JP | 2001-240767 | 9/2001 |
| JP | 2002-060698 | 2/2002 |
| JP | 2004-010778 | 1/2004 |
| JP | 2005-000821 | 1/2005 |
| JP | 2005-061042 | 3/2005 |
| JP | 2006-289247 | 10/2006 |
| JP | 2007-023064 | 1/2007 |
| WO | 9618858 | 6/1996 |
| WO | 02/14445 A1 | 3/2001 |
| WO | WO 03/095566 | 11/2003 |
| WO | 2004/090030 A1 | 10/2004 |
| WO | WO 2005000914 A1 * | 1/2005 |
| WO | WO 2005/019358 | 3/2005 |
| WO | 2006/058782 A1 | 6/2006 |
| WO | WO 2009/097205 | 8/2009 |

OTHER PUBLICATIONS

Military Specification, MIL-E-460968(MR), Amendment 1, (Dec. 8, 1969), Enamel, Lustreless, Quick Drying, Styrenated Alkyd Type, Solar Heat Reflecting, Olive Drab, 1-30.

Pickett, Charles F., Solar Heat Reflecting Coatings, Society of Automotive Engineers, International Automotive Engineering Congress, Detroit, Mich., (Jan. 13-17, 1969), 1-5.

Brady, Robert F. and Wake, Lindsay V., Principles and formulations for organic coatings with tailored infrared properties, Progress in Organic Coatings, 20, (1992), 1-25, Elsevier Sequoia.

SciFinder—CAS Registry No. 5521-31-3, Sep. 17, 2013, 1 page.

\* cited by examiner

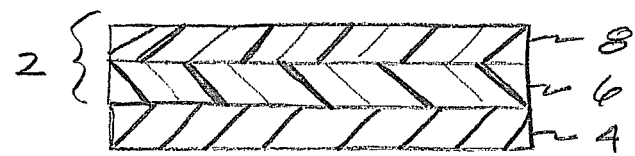

COATING SYSTEM EXHIBITING COOL DARK COLOR

CROSS REFERENCE TO RELATED APPLICATION

This application claims the benefit of U.S. Provisional Patent Application No. 60/899,608 filed Feb. 5, 2007, which is hereby incorporated by reference in its entirety.

FIELD OF THE INVENTION

The present invention relates to coating systems that exhibit a dark color and minimally absorb radiation in the near infrared spectrum.

BACKGROUND OF THE INVENTION

For many coating applications such as automotive coatings, aerospace coatings, industrial coatings and architectural coatings, dark colors, such as black and dark blue are particularly desirable for aesthetic purposes. However, dark colored vehicles and buildings (or other enclosed spaces) are susceptible to absorption of infrared (IR) radiation. These dark colored structures reflect insignificant amounts of IR radiation. As a result, the structures exhibit increased temperatures and become quite hot, particularly on sunny days, rendering them uncomfortable for their occupants. In addition, such vehicles or buildings are then more expensive to operate since higher levels of air conditioning are required to maintain them comfortably, as compared to structures having lighter colors with high reflectivity, such as vehicles that are coated with white or silver coating compositions.

Dark colored coating compositions have conventionally used carbon black as a pigment. Carbon black absorbs a broad spectrum of visible radiation and provides a desirable dark black color (jet black) when used in a coating composition. However, this broad spectrum also includes radiation outside the visible range. Accordingly, black coatings containing carbon black have a tendency to increase in temperature as the energy of the non-visible radiation is absorbed along with the visible radiation.

One solution for avoiding the thermal load experienced by black coatings containing carbon black has been to provide a two layer system. An upper layer contains an organic black pigment or a mixture of organic pigments that absorb visible radiation to exhibit a dark color but which are substantially transparent to IR radiation, and a lower layer includes a composition that reflects IR radiation. While the lower IR reflecting layer reflects IR radiation and minimizes the temperature increase of the coating system, the overlying organic pigment layer contains pigments that substantially scatter light compared to well-dispersed carbon black pigment. Accordingly, the organic black pigment layer does not achieve a true black color and may appear grey or brown.

In another approach, IR reflecting compositions include a black pigment as a colorant and a reflective pigment to reflect the IR radiation. Again, such coating compositions do not typically exhibit a deep color such as jet black.

SUMMARY OF THE INVENTION

The present invention is directed to a layered coating system displaying a dark color that includes a first IR-reflecting layer comprising IR-reflective pigments in a resinous binder and a second visible radiation absorbing layer that displays a dark color and is substantially transparent to IR radiation, the second layer comprising a tint in a resinous binder, the tint comprising nano-sized pigments having an average primary particle size of up to 100 nm. The present invention also includes a method of controlling the temperature increase of a substrate exposed to infrared radiation comprising applying an IR-reflecting coating composition as a first layer onto a substrate and applying a visible radiation absorbing coating composition that is substantially transparent to IR radiation on the first layer to form a second layer, wherein the second layer comprises a tint in a resinous binder such that the second layer displays a dark color, the tint comprising nano-sized pigments having an average primary particle size of up to 100 nm. Also included in the present invention is a coating system that includes a first IR-reflecting layer comprising IR-reflective pigments in a resinous binder and a second visible radiation absorbing layer that displays a dark color and is substantially transparent to IR radiation, said second layer comprising a tint in a resinous binder, the tint comprising nano-sized pigments, wherein the pigments are sized up to 100 nm, the tint exhibits a maximum haze of 1% and the coating system has a jetness value of at least 240.

BRIEF DESCRIPTION OF THE DRAWING

FIG. 1 is a systematic representation of a layered coating system of the present invention.

DETAILED DESCRIPTION OF THE INVENTION

The present invention is directed to a coating system that exhibits dark colors (such as jet black) and experiences a substantially reduced temperature rise, as compared to coatings containing carbon black, when exposed to a broad spectrum of radiation such as sunlight. A dark colored coating composition, coating system or the like means that the composition or system displays a dark color such as jet black or substantially black or sufficiently deeply colored to exhibit a jetness value as defined hereinafter. By substantially reduced temperature rise compared to carbon black coatings, it is meant that an article bearing the coating system of the present invention experiences an increase in temperature due to absorption of radiation that is readily detected (such as by touch) as being less than the temperature increase of carbon black coatings. As described herein, IR radiation refers to solar IR radiation, which includes radiation in the electromagnetic spectrum at wavelengths of about 700 nm to 2500 nm. Visible radiation is considered herein to include radiation in the electromagnetic spectrum at wavelengths of about 400 nm up to 700 nm.

FIG. 1 shows the coating system 2 of the present invention as applied to a substrate 4 and including an IR reflecting layer 6 and a visible radiation absorbing layer 8 The substrate 4 may take numerous forms and be produced from a variety of compositions, including components of an automobile including metal panels, leather or fabric seating areas, plastic components such as dashboards or steering wheels, and/or other interior surfaces of a vehicle; aerospace components including aircraft exterior panels (which may be metal or produced from composite materials or the like), leather, plastic or fabric seating areas and interior panels, including control panels and the like; building components including exterior panels and roofing materials; and industrial components. These examples are not meant to be limiting. Any coated article, particularly articles that are coated with dark coating compositions, may be suitable for use with the present invention in order to apply a dark coating composition that experiences insubstantial increase in temperature when exposed to a broad spectrum of radiation such as sunlight, and in particular, reflects infrared radiation.

The coating system 2 of the present invention includes an IR reflecting layer 6 that includes IR reflective pigments in a resinous binder. Suitable resinous binders are aqueous or solvent-based and include those that are used in automotive OEM compositions, automotive refinish compositions, industrial coatings, architectural coatings, electric coatings, powder coil coatings and aerospace coatings. Such suitable resinous binders may include a curable coating composition containing components such as hydroxyl or carboxylic acid containing acrylic copolymers and hydroxyl or carboxylic acid containing polyester polymers and oligomers and isocyanate or hydroxyl-containing polyurethane polymers or amine or isocyanate containing polyureas which can enhance cure rate, appearance and other physical properties of the cured coating. In one embodiment, the IR reflecting layer 6 includes components for reflecting infrared radiation such as iron oxide powder, titanium oxide powder, scaly aluminum powder, stainless steel powder and mica powder (which may be covered with titanium oxide) as are conventional. As such, the IR reflecting layer 6 may be a light colored layer (e.g., may be white) that reflects IR radiation. Alternatively, the IR reflecting layer 6 may also include non-IR absorbing pigments. Non-IR absorbing pigments may be provided so that the IR reflecting layer 6 has some color and is not essentially light colored. Non-limiting examples of non-IR absorbing pigments are Pigment Yellow 138, Pigment Yellow 139, Pigment Red 179, Pigment Red 202, Pigment Violet 29, Pigment Blue 15:3, Pigment Green 36, Paliogen and Lumogen black pigments from BASF. In the event that the visible radiation absorbing layer 8 is damaged and exposes the IR reflecting layer 6 during use of the coating system 2, the IR reflecting layer 6 having some color will not exhibit a light color that "grins through" the damaged coating system 2. In addition, the IR reflecting layer 6 may also include conventional IR reflective black pigments, such as Ceramic Color AG235 Black and Ceramic Color AB820 Black (Kawamura Chemical), V-780 IR Black and V-799 IR Black and 10201 Eclipse Black and 10202 Eclipse Black and 10203 Eclipse Black (Ferro Pigments), Black 411A (Shepherd), and Sicopal Black K 0095 (BASF).

It is contemplated that the IR reflecting layer 6 is applied directly to a substrate 4 of an article for which temperature increase is an issue. It should be understood that the substrate 4 may also include additional treatment layers and that the first layer 6 is still considered to be applied onto the substrate 4 when additional layers are applied onto the substrate 4. For example, when a substrate 4 is the panel of a vehicle (such as an automobile or aircraft), the vehicle panel may also include an electrocoated treatment layer or a phosphate treatment layer thereon. In this instance, the first layer is actually applied to the electrocoat layer or the like, however, according to the invention, the first layer 6 is still considered to be applied onto the substrate 4.

The second layer 8 for absorbing visible radiation at a desired wavelength to exhibit a desired color is applied onto the IR reflecting layer 6 and includes nano-sized pigments dispersed in a resinous binder. The resinous binder may be the same or different as the resinous binder of the IR reflecting layer 6 and may include the above-described polymeric components. The nano-sized pigments in the visible radiation absorbing layer 8 are substantially transparent in IR radiation wavelengths, such that IR radiation external to the substrate 4 is substantially transmitted through the second layer 8. By substantially transparent, it is meant that the nano-sized pigments in the visible radiation absorbing layer 8 transmit the energy of the infrared radiation without appreciable scattering or absorption thereof. Accordingly, the IR radiation is reflected away from the substrate 4 by the IR reflective pigments in the IR reflecting layer 6. Upon reflection of the IR radiation by the IR reflecting layer 6, the substrate 4 and any underlying components exhibit substantially reduced temperature rise compared to conventional dark coatings (e.g. carbon black coatings) due to the reduced absorption of IR radiation.

The nano-sized pigments contained in the visible radiation-absorbing layer may be composed of a single component such as Lumogen® black pigment available from BASF (a perylene-based black pigment) or a plurality of pigments that are selected in order to achieve a desired color. By nano-sized, it is meant that the pigments have an average primary particle size (for individual particles or agglomerates thereof) of less than one micron, more particularly of up to about 100 nm, or up to about 50 nm, such as up to about 30 nm.

To prepare the radiation absorbing layer 8, in one embodiment of the invention, the nano-sized pigments are added to the resinous binder in the form of tints. By tint, it is meant a composition of pigment in a dispersant, which may be a resinous (polymeric) material compatible with solvent based resinous binders or which may be compatible with aqueous coating systems.

In one embodiment, the tints containing nano-sized pigments are produced from conventional pigments of varying colors, including red, green, violet, yellow and blue. Non-limiting examples of suitable pigments include Pigment Yellow 138, Pigment Yellow 139, Pigment Red 179, Pigment Red 202, Pigment Violet 29. Pigment Blue 15:3, and Pigment Green 36. The tints containing nano-sized pigments may be prepared by milling bulk organic pigments with milling media having a particle size of less than about 0.5 mm, preferably less than 0.3 mm and more preferably about 0.1 mm or smaller. The tints containing pigment particles are milled to reduce the pigment primary particle size to nanoparticulate sizes in a high energy mill in an organic solvent system, such as butyl acetate using a dispersant, with an optional polymeric grinding resin.

Suitable dispersants include acrylic copolymers produced by atom transfer radical polymerization and having a head portion and a tail portion in which the head portion exhibits affinity for pigments (such as aromatic groups), and the tail portion is compatible with resinous binders of coating compositions (such as acrylic groups), with the polymer having a weight average molecular weight of 1,000 to 20,000. For example, the dispersant may include a block copolymer having a first block comprising an oxirane functional monomer reacted with a polycyclic aromatic carboxylic acid and one or more additional blocks comprising (meth)acrylic acid alkyl esters. In one embodiment, the first block includes a glycidyl (meth)acrylate reacted with a napthoic acid and second and third blocks that are different from each other, each including (meth)acrylic acid alkyl esters. An example of such a dispersant can be found in SAC8R61, a coating commercially available from PPG Industries, Inc.

Other suitable dispersants include Solsperse® 32,500 available from Lubrizol Corporation of Wickliffe, Ohio, Disperbyk 2050 available from Byk Additives & Instruments of Wesel, Germany, or Solsperse® 27,000 (used in aqueous systems) available from Lubrizol Corporation.

In one embodiment, the tints have a maximum haze of 10%, such as a maximum haze of 5% or a maximum haze of 1%, as described in U.S. Pat. No. 6,875,800, incorporated herein by reference. Haze is a measurement of the transparency of a material and is defined by ASTM D 1003. The haze values described herein are determined using an X-Rite 8400 spectrophotometer in transmittance mode with a 500 micron path-length cell on pigments dispersed in a suitable solvent such as n-butyl acetate. Because the percent haze of a liquid sample is concentration dependent (and therefore on the transmittance of light through the liquid), the percent haze is described herein at a transmittance of about 15% to about 20% (such as at 17.5%) at the wavelength of maximum absorbance.

Other suitable methods of producing the nano-sized pigments in tints include crystallization, precipitation, gas phase condensation, and chemical attrition (i.e., partial dissolution). The tints containing nano-sized pigments may be mixed in order to obtain the desired dark color.

In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in United States Patent Application Publication 2005/0287348 A1, filed Jun. 24, 2004 and United States Patent Application Publication 2006/0251896, filed Jan. 20, 2006, both incorporated herein by reference.

In one embodiment of the invention, the coating system exhibits a jet black color. Jetness of a color is a measure of the darkness of the color. The jetness may be quantified by obtaining color data from a spectrophotometer and using the following formula as discussed in K. Lippok-Lohmer, Farbe+ Lack, 92, p. 1024 (1986):

$$\text{Jetness}=100*(\log_{10}(Xn/X)+\log_{10}(Yn/Y)-\log_{10}(Zn/Z)).$$

Accordingly, a desirable black coating system has a high jetness value. In one embodiment of the invention, the jetness value is at least 240. To achieve a high jetness value, the tints may be used individually or in combination to yield a dark color to the coating system of the present invention. In particular, it has been found that a plurality of tints (with none such tints being a carbon black pigment) may be used in combination in a coating composition to achieve a jet black color, such as having a jetness value of at least 240.

It has been found that the layered coating system of the present invention is particularly suited for producing cool dark colors in a coating composition for application to a variety of substrates. The visible radiation absorbing layer absorbs a broad spectrum of visible radiation to achieve a dark color but is transparent to IR radiation. The nano-sized pigment particles avoid scattering of incident light so that a clean, dark color is perceived. The IR radiation passing through the visible radiation absorbing layer is reflected by the underlying IR reflecting layer. In this manner, the coating system does not absorb IR radiation so that an article coated therewith experiences reduced temperature increase compared to conventional carbon black coatings by expelling the IR radiation. The coating system of the present invention is particularly useful in automotive coatings, architectural coatings, industrial coatings, aerospace coatings (such as on aircraft) and flexible coatings (such as on footwear).

The invention will further be described by reference to the following examples:

EXAMPLES

Examples 1-7

Piciment Dispersions

Example 1

Pigment Yellow 138 (PY 138) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 2

Pigment Yellow 139 (PY 139) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 3

Pigment Red 179 (PR 179) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 4

Pigment Violet 29 (PV 29) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 5

Pigment Blue 15:3 (PB 15:3) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 6

Lumogen Black FK 4280 was milled and dispersed in the mill base formula shown in Table 1, on a QM-1 QMAX Supermill (Premier Mill, SPX Process Equipment) using 0.3 mm YTZ milling media to the final % haze value shown in Table 2.

Comparative Example 7

A conventional pigment dispersion of Lumogen Black FK 4280 was milled and dispersed in the mill base formula shown in Table 1 using a Dispermat CN F2 model dispersator with the Dispermat+TML 1 (Basketmill) attachment, using 1.2-1.7 mm Zirconox milling media, to a Hegman of 6. The final % haze value is shown in Table 2.

TABLE 1

| Mill Base Ingredients | Weight % of Tint Formula | | | | | | |
|---|---|---|---|---|---|---|---|
| | Example 1 | Example 2 | Example 3 | Example 4 | Example 5 | Example 6 | Comparative Example 7 |
| Dispersant Resin* | 29.07 | 28.92 | 25.46 | 29.98 | 29.68 | 20.07 | 20.95 |
| N-butyl acetate | 60.78 | 60.97 | 64.35 | 59.52 | 58.89 | 0 | 0 |
| Xylene | 0 | 0 | 0 | 0 | 0 | 69.92 | 0 |
| Dowanol PM acetate | 0 | 0 | 0 | 0 | 0 | 0 | 68.58 |
| Solsperse 5000 synergist (Lubrizol) | 0 | 0 | 0 | 0 | 1.05 | 0 | 0 |
| Paliotol Yellow L 0962 HD (BASF Pigments) | 10.15 | 0 | 0 | 0 | 0 | 0 | 0 |
| Paliotol Yellow L 2140 HD (BASF Pigments) | 0 | 10.11 | 0 | 0 | 0 | 0 | 0 |
| Irgazin Red 379 (Ciba Pigments) | 0 | 0 | 10.19 | 0 | 0 | 0 | 0 |
| Perrindo Violet 29 V4050 (Sun Chemical) | 0 | 0 | 0 | 10.50 | 0 | 0 | 0 |
| Heliogen Blue L7081D (BASF Pigments) | 0 | 0 | 0 | 0 | 10.38 | 0 | 0 |
| Lumogen Black FK 4280 (BASF Pigments) | 0 | 0 | 0 | 0 | 0 | 10.01 | 10.47 |

*An acrylic polymer was prepared as generally described in U.S. Pat. No. 6,365,666 by atom transfer radical polymerization techniques from the following monomers on a weight basis: butyl acrylate 19.9%, butyl methacrylate 21.5%, glycidyl methacrylate 20.5%, and hydroxyl propyl methacrylate 38.1%. The glycidyl methacrylate units in the polymer were functionalized with 3-hydroxy-2-naphthoic acid. The polymer has a weight average molecular weight of about 9300.

TABLE 2

| Tint Characteristics | Example 1 | Example 2 | Example 3 | Example 4 | Example 5 | Example 6 | Comparative Example 7 |
|---|---|---|---|---|---|---|---|
| % Non-volatile by weight | 39.22 | 39.03 | 35.65 | 40.48 | 41.11 | 30.08 | 15.00 |
| % Pigment by weight | 10.15 | 10.11 | 10.19 | 10.5 | 10.38 | 10.01 | 10.00 |
| % Haze* | 0.4 | 0.4 | 0.1 | 0.1 | 0.2 | 0.3 | 34.9 |

*For analysis, the final tints were diluted with solvent. The % haze was measured with an X-Rite 8400 spectrophotometer in transmittance mode with a 500 micron path-length cell. The % haze reported here is at a transmittance of about 17.5% at the wavelength of maximum absorbance.

Examples 8-12

Coatinci Compositions

Example 8

Paint was formulated using 7.15 g of PPG Industries, Inc. automotive clear coating (Diamond coat, DCT5002HC/DCT5001 B) and 2.96 g of a mixture of tints consisting of: 10.14 wt % of tint from Example 1, 6.17 wt % of tint from Example 2, 12.21 wt % of tint from Example 3, 33.40 wt % of tint from Example 4, and 38.08 wt % tint from Example 5. The amount of pigment in the paint was 6 wt % of the total non-volatiles in the paint, and the weight percentage of each individual pigment on the total pigment content was 10% Pigment Yellow 138, 6% Pigment Yellow 139, 12% Pigment Red 179, 34% Pigment Violet 29, and 38% Pigment Blue 15:3. This paint was drawn using a #40 wire wound draw down bar (PA-4140, Byk-Gardner) onto a TRU Aluminum 04×12×038, treated unpolished coil coated white panel (APR33700, ACT Test Panels). The jetness value of the cured paint film, percent total solar reflectance, and heat buildup of the panel were measured and are reported in Table 3.

Comparative Example 9

Example 8 was repeated to produce a painted panel, except the tint mixture was produced from a mixture of conventional tints, where the weight percentage of the pigments in the final paint was the same as in Example 8, namely, 6 wt % pigment on total non-volatiles, of which is 10% Pigment Yellow 138, 6% Pigment Yellow 139, 12% Pigment Red 179, 34% Pigment Violet 29, and 38% Pigment Blue 15:3. The panel was tested for jetness, % TSR and heat buildup as reported in Table 3. Example 8 displayed significantly improved jetness compared to Comparative Example 9.

Example 10

Paint was formulated using 7.15 g of PPG Industries, Inc. automotive clear coating (Diamond coat, DCT5002HC/DCT5001 B) and 2.89 g of the tint from Example 6. The amount of pigment in the paint was 6 wt % of the total non-volatiles in the paint. This paint was drawn onto a panel as in Example 8 and tested for jetness, % TSR and heat buildup as reported in Table 3.

Comparative Example 11

Example 10 was repeated except 2.78 g of the tint from Comparative Example 7 was used instead of the tint of Example 6. The amount of pigment in the paint was 6 wt % of the total non-volatiles in the paint. This paint was drawn onto a panel as in Example 10 and tested for jetness, % TSR and heat buildup as reported in Table 3. Example 10 displayed significantly improved jetness compared to Example 11.

Comparative Example 12

As a comparative example to Examples 8-11, a carbon black-containing paint was formulated using PPG Industries, Inc. automotive clear coating (Diamond coat, DCT5002HC/DCT5001B) and a conventional black tint. The amount of carbon black pigment in the paint was 6 wt % of the total non-volatiles in the paint. This paint was drawn onto a panel as in Examples 8-11 and tested for jetness, % TSR and heat buildup as reported in Table 3. Examples 8, 9, 10, and 11 all displayed significantly improved % TSR and significantly less temperature rise above ambient temperature than Example 12.

TABLE 3

| Example | Jetness* | % TSR** | ΔTlu (° F.)*** |
|---|---|---|---|
| 8 | 299 | 32.7 | 112 |
| 9 (Comparative) | 222 | 34.7 | 112 |
| 10 | 343 | 32.8 | 115 |
| 11 (Comparative) | 234 | 34.4 | 106 |
| 12 (Comparative) | 327 | 4.3 | 149 |

*Jetness was measured by obtaining the color data from a spectrophotometer (XRite MA68, using 75° color data) and using the following formula: Jetness = 100 * ($\log_{10}(Xn/X) + \log_{10}(Y_n/Y) - \log_{10}(Z_n/Z)$) as discussed in K. Lippok-Lohmer, Farbe + Lack, 92, p. 1024 (1986).
**The percent total solar reflectance (% TSR) was calculated using the methods of ASTM E 903 and ASTM E 891 from data measured with a Cary 500 (Varian) spectrophotometer over the wavelength range or 300-2500 nm.
***The heat build up was quantified by the temperature rise above ambient temperature in the laboratory under a heat lamp as described in ASTM D 4803-97.

Examples 13-14

Pigment Dispersions

Example 13

Lumogen Black FK 4280 was milled and dispersed in the mill base formula shown in Table 4, with Duraspheres, borosilicate glass spheres 40-80 microns (GL-0179, from MoSci Corporation) in a 1.25 quart water-cooled stainless steel flask using a Lab Dispersator (Model 2000, Premier Mill) to nano-sized particles with the final % haze value shown in Table 5.

Comparative Example 14

Lumogen Black FK 4280 was milled and dispersed in the mill base formula shown in Table 4, in an 8 oz. container, using 0.7-1.2 mm Zirconox milling media, on a Red Devil shaker for 30 minutes, to a Hegman of 8, and attaining the final % haze value shown in Table 5.

TABLE 4

| | Weight % of Tint Formula | |
|---|---|---|
| Mill Base Ingredients | Example 13 | Comparative Example 14 |
| Disperbyk 2050 (Byk Additives & Instruments) | 28.58 | 35.49 |
| Xylene | 74.07 | 55.41 |
| Lumogen Black FK 4280 (BASF Pigments) | 5.35 | 9.10 |

TABLE 5

| Tint Characteristics | Example 13 | Comparative Example 14 |
|---|---|---|
| % Non-volatile by weight | 16.05 | 27.55 |
| % Pigment by weight | 5.35 | 9.10 |
| % Haze* | 3.4 | 14.5 |

*For analysis, the final tints were diluted with solvent. The % haze was measured with an X-Rite 8400 spectrophotometer in transmittance mode with a 500 micron path-length cell. The % haze reported here is at a transmittance of about 17.5% at the wavelength of maximum absorbance.

Examples 15-16

Coating Compositions

Example 15

Paint was formulated using 5.72 g of PPG Industries, Inc. automotive clear coating (Diamond coat, DCT5002HC/DCT5001 B) and 4.32 g of the tint from Example 13. The amount of pigment in the paint was 6 wt % of the total non-volatiles in the paint. This paint was drawn using a #60 wire wound draw down bar (PA-4140, Byk-Gardner) onto a TRU Aluminum 04×12×038, treated unpolished coil coated white panel (APR33700, ACT Test Panels). The jetness, % TSR, and the heat buildup of the panel are shown in Table 6.

Comparative Example 16

As a comparative example to Example 15, paint was formulated using 5.72 g of PPG Industries, Inc. automotive clear coating (Diamond coat, DCT5002HC/DCT5001B) and 2.55 g of the tint from Comparative Example 14. The amount of pigment in the paint was 6 wt % of the total non-volatiles in the paint. This paint was drawn using a #60 wire wound draw down bar (PA-4140, Byk-Gardner) onto a TRU Aluminum 04×12×038, treated unpolished coil coated white panel (APR33700, ACT Test Panels). The jetness, % TSR, and heat buildup of the panel are shown in Table 6. Example 15 displayed significantly improved jetness compared to Comparative Example 16.

TABLE 6

| Example | Jetness* | % TSR** | ΔTlu (° F.)*** |
| --- | --- | --- | --- |
| 15 | 265 | 34.4 | 118 |
| 16 (Comparative) | 212 | 33.4 | 113 |

*Jetness was measured by obtaining the color data from a spectrophotometer (X-Rite MA68, 75° color data) and using the following formula: Jetness = 100 * ($\log_{10}(X_n/X) + \log_{10}(Y_n/Y) - \log_{10}(Z_n/Z)$) as discussed in K. Lippok-Lohmer, Farbe + Lack, 92, p. 1024 (1986).
**The % total solar reflectance (% TSR) was calculated using the methods of ASTM E 903 and ASTM E 891 from data measured with a Cary 500 (Varian) spectrophotometer over the wavelength range or 300-2500 nm.
***The heat build up (ΔTlu) was quantified by the temperature rise above ambient temperature in the laboratory under a heat lamp as described in ASTM D 4803-97.

Comparative Example 17

White Panel

As a comparative example to the coated panels of Examples 8-12, 15 and 16, the jetness, the % total solar reflection (% TSR), and the heat buildup (ΔTlu) were measured on a coated white panel as used in those Examples, namely a TRU Aluminum 04×12×038, treated unpolished coil coated white panel (APR33700, ACT Test Panels). The jetness value was 11, the % TSR was 73.3 and ATlu was 95° F.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. A layered coating system comprising:
a first IR-reflecting layer comprising IR-reflective pigments in a resinous binder; and
a second visible radiation absorbing layer that is transparent to IR radiation, said second layer comprising a plurality of tints in a resinous binder, said tints comprising nano-sized pigments having an average primary particle size of up to 100 nm, wherein at least one of said tints comprises a non-black pigment,
wherein said layered coating system exhibits a jetness value of at least 240.

2. The layered coating system of claim 1, wherein said nano-sized pigments have an average primary particle size of up to 50 nm.

3. The layered coating system of claim 1, wherein said nano-sized pigments have an average primary particle size of up to 30 nm.

4. The layered coating system of claim 1, wherein said tints each have a maximum haze of 10%.

5. The layered coating system of claim 4, wherein said tints each have a maximum haze of 1%.

6. The layered coating system of claim 4, wherein no such tints comprise carbon black pigment.

7. The layered coating system of claim 1, wherein at least one of the tints comprises a dispersant comprising a tri-block copolymer comprising:
(i) a first block comprising an oxirane functional monomer reacted with a carboxylic acid;
(ii) a second block comprising a (meth)acrylic acid alkyl ester; and
(iii) a third block comprising a (meth)acrylic acid alkyl ester, wherein the third block is different from the second block.

8. The layered coating system of claim 1, wherein said tints do not comprise a carbon black pigment.

9. A coating exhibiting a jet black color, wherein:
(a) the coating is deposited from a composition comprising:
(i) a resinous binder; and
(ii) a plurality of tints having a maximum haze of 10% and comprising nano-sized pigments having an average primary particle size of up to 100 nanometers, wherein at least one of the tints comprises a non-black pigment; and
(b) the coating has a jetness value of at least 240.

10. The coating of claim 9, wherein the tints each have a maximum haze of 1%.

11. The coating of claim 10, wherein none of said plurality of tints comprises carbon black.

12. The coating of claim 9, wherein at least one of the tints comprises a dispersant comprising a tri-block copolymer comprising:
(i) a first block comprising an oxirane functional monomer reacted with a carboxylic acid;
(ii) a second block comprising a (meth)acrylic acid alkyl ester; and
(iii) a third block comprising a (meth)acrylic acid alkyl ester, wherein the third block is different from the second block.

13. The coating of claim 9, wherein said tints do not comprise a carbon black pigment.

* * * * *